United States Patent
Mo et al.

(10) Patent No.: US 11,796,715 B2
(45) Date of Patent: Oct. 24, 2023

(54) HYBRID TIME-OF-FLIGHT SENSOR AND IR SENSOR

(71) Applicant: Sloan Valve Company, Franklin Park, IL (US)

(72) Inventors: Xiaoxiong Mo, Lexington, MA (US); Qiaohong Chen, Lexington, MA (US); Haiou Wu, Dedham, MA (US)

(73) Assignee: Sloan Valve Company, Franklin Park, IL (US)

( * ) Notice: Subject to any disclaimer, the term of this patent is extended or adjusted under 35 U.S.C. 154(b) by 202 days.

(21) Appl. No.: 17/356,635

(22) Filed: Jun. 24, 2021

(65) Prior Publication Data

US 2021/0405245 A1    Dec. 30, 2021

Related U.S. Application Data

(60) Provisional application No. 63/043,305, filed on Jun. 24, 2020.

(51) Int. Cl.
| | | |
|---|---|---|
| *G01V 13/00* | (2006.01) | |
| *G01V 8/12* | (2006.01) | |
| *G01S 17/08* | (2006.01) | |
| *G01S 17/87* | (2020.01) | |
| *G01S 7/497* | (2006.01) | |
| *G05B 15/02* | (2006.01) | |
| *A47K 5/12* | (2006.01) | |

(Continued)

(52) U.S. Cl.
CPC .............. *G01V 13/00* (2013.01); *G01S 7/497* (2013.01); *G01S 17/08* (2013.01); *G01S 17/87* (2013.01); *G01V 8/12* (2013.01); *G05B 15/02* (2013.01); *A47K 5/1217* (2013.01); *E03C 1/057* (2013.01); *E03D 5/105* (2013.01)

(58) Field of Classification Search
CPC ....... A47K 5/1217; E03C 1/057; E03D 5/105; G01S 7/497; G01S 17/08; G01S 17/87; G01V 8/12; G01V 13/00; G05B 15/02
See application file for complete search history.

(56) References Cited

U.S. PATENT DOCUMENTS

| | | |
|---|---|---|
| 5,278,423 A | 1/1994 | Wangler et al. |
| 6,323,942 B1 | 11/2001 | Bamji |

(Continued)

OTHER PUBLICATIONS

Nov. 23, 2021—(WO) ISR and WO—App PCT/US2021/038834.

*Primary Examiner* — Mark R Gaworecki
(74) *Attorney, Agent, or Firm* — Banner & Witcoff, Ltd.

(57) ABSTRACT

A hybrid sensor for calibrating a primary active infrared (IR) sensor to more accurately locate, continuously calibrate, and conserve energy by more accurately detecting via the active IR detection is described herein. The hybrid sensor includes one or more infrared sensors and one or more time-of-flight sensors. The time-of-flight sensor may remain in a dormant state (e.g., low power or sleep mode) until the one or more infrared sensors detect an object. In response to detecting an object, the time-of-flight sensor may be activated to obtain several measurements of the object. After obtaining the measurements, the time-of-flight sensor may return to its dormant state. The hybrid sensor may use the measurements obtained by the time-of-flight sensor to calibrate the one or more infrared sensors to provide more accurate measurements on an object-by-object basis.

30 Claims, 8 Drawing Sheets

(51) Int. Cl.
    *E03C 1/05*         (2006.01)
    *E03D 5/10*         (2006.01)

(56)            References Cited

U.S. PATENT DOCUMENTS

| | | |
|---|---|---|
| 7,209,221 B2 | 4/2007 | Breed et al. |
| 7,667,824 B1 | 2/2010 | Moran |
| 7,787,131 B1 | 8/2010 | Moran |
| 7,852,462 B2 | 12/2010 | Breed et al. |
| 7,956,988 B1 | 6/2011 | Moran |
| 8,027,029 B2 | 9/2011 | Lu et al. |
| 8,274,037 B2 | 9/2012 | Ritter et al. |
| 8,530,819 B2 | 9/2013 | Ritter et al. |
| 8,638,426 B2 | 1/2014 | Oron et al. |
| 8,670,953 B2 | 3/2014 | Yuen et al. |
| 8,760,631 B2 | 6/2014 | Ritter et al. |
| 8,767,186 B2 | 7/2014 | Lu et al. |
| 8,830,060 B2 | 9/2014 | Pikkarainen et al. |
| 9,119,552 B2 | 9/2015 | Baumann et al. |
| 9,195,347 B2 | 11/2015 | Stark et al. |
| 9,348,019 B2 * | 5/2016 | Wang .................. G01S 7/4816 |
| 9,378,640 B2 | 6/2016 | Mimeault et al. |
| 9,383,445 B2 | 7/2016 | Lu et al. |
| 9,417,734 B2 | 8/2016 | Raynor et al. |
| 9,612,625 B2 | 4/2017 | Oliver et al. |
| 9,613,406 B2 | 4/2017 | Chen et al. |
| 9,746,557 B2 | 8/2017 | Camarri et al. |
| 9,829,564 B2 | 11/2017 | Bruder et al. |
| 9,989,623 B2 | 6/2018 | Send et al. |
| 2010/0201276 A1 * | 8/2010 | Chen ...................... G01S 17/04 |
| | | 315/158 |
| 2012/0095575 A1 | 4/2012 | Meinherz et al. |
| 2015/0268342 A1 | 9/2015 | Iott et al. |
| 2016/0070265 A1 | 3/2016 | Liu et al. |
| 2016/0223588 A1 | 8/2016 | Fox |
| 2017/0040362 A1 * | 2/2017 | Na .................... H01L 27/14605 |
| 2017/0051481 A1 | 2/2017 | Mercer |
| 2017/0062508 A1 * | 3/2017 | Na ........................ H01L 31/105 |
| 2017/0265034 A1 | 9/2017 | Yu et al. |
| 2017/0286756 A1 | 10/2017 | Yu et al. |
| 2017/0332950 A1 | 11/2017 | Yu et al. |
| 2017/0335553 A1 * | 11/2017 | Martin ................ F16K 31/0675 |
| 2017/0363465 A1 | 12/2017 | Send et al. |
| 2017/0363721 A1 | 12/2017 | Yang et al. |
| 2017/0366737 A1 | 12/2017 | Yang et al. |
| 2018/0067212 A1 | 3/2018 | Wilson et al. |
| 2018/0217234 A1 | 8/2018 | Skowronek |
| 2018/0236927 A1 | 8/2018 | Rae |
| 2019/0369247 A1 | 12/2019 | Lindner et al. |
| 2020/0310419 A1 * | 10/2020 | Sato .................... G05D 1/0066 |

\* cited by examiner

700

HYBRID TIME-OF-FLIGHT SENSOR AND IR SENSOR

CROSS-REFERENCE TO RELATED APPLICATIONS

This application claims priority to U.S. Provisional Application No. 63/043,305, filed on Jun. 24, 2020 and entitled "Genesis Hybrid Time of Flight and Active IR Sensor," the entirety of which is hereby incorporated herein by reference.

FIELD OF THE DISCLOSURE

Aspects of the disclosure generally relate to a hybrid sensor and, more specifically, to a method of calibrating an infrared sensor using a time-of-flight sensor.

BACKGROUND OF THE DISCLOSURE

Sensors are employed in a variety of locations to manage the control and/or flow of water. For example, sensors may be used in kitchen sinks to activate and/or deactivate the flow of water from a faucet. Similarly, sensors may be used in restrooms, for example, at urinals, toilets, and faucets. These battery-operated sensors may use one or more infrared (IR) sensors to detect a person proximate to the location of the sensor. However, different fabrics reflect and/or absorb light, and in particular infrared light, at different rates. Accordingly, different fabrics may render these sensors unreliable or, worse, completely ineffective. While other sensors may be used to detect and determine a person's location with respect to the sensor, these sensors consume significant amounts of energy and deplete batteries. Without power, the sensors, and the fixtures they are intended to operate, are rendered unusable. Thus, there is a need to more accurately detect a user's location proximate to a fixture using limited energy consumption.

BRIEF SUMMARY OF THE DISCLOSURE

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, methods, and computer-readable media are also within the scope of the disclosure.

Example apparatuses and systems disclosed herein describe a hybrid sensor configured to detect the presence and/or proximate location of a user. The hybrid sensor may comprise one or more infrared (IR) transmitters configured to emit light in the infrared spectrum at one or more targets, one or more photoreceptor cells configured to detect infrared light reflected off of the one or more targets, and one or more time-of-flight sensors configured to determine a distance of the one or more targets from the hybrid sensor. The hybrid sensor may initiate a mechanical operation, for example, in response to detecting a user within a predefined range (e.g., zone) of the hybrid sensor. For example, the mechanical operation may include turning on a faucet, dispensing soap from a soap dispenser, and/or opening a door. Additionally or alternatively, the hybrid sensor may initiate the mechanical operation, for example, in response to detecting that the user is no longer within the predefined range of the hybrid sensor after a period of time. In this regard, the mechanical operation may include turning off a faucet or flushing a toilet and/or urinal.

Example methods and systems disclosed herein describe a hybrid sensor for detecting the motion and/or position of an object. The hybrid sensor may comprise a control circuit, one or more IR sensors (e.g., one or more IR transmitters and one or more IR receivers), and/or one or more time-of-flight sensors. The control circuit may cause the one or more IR transmitters to emit IR light at a steady (e.g., constant) rate. The control circuit may cause the one or more time-of-flight sensors to remain in a dormant state (e.g., low power and/or sleep mode). The one or more time-of-flight sensors may be activated, for example, if reflected IR light is detected by the one or more IR receivers. Activating the one or more time-of-flight sensors may cause the one or more time-of-flight sensors to obtain one or more measurements. These measurements may be a distance an object is located from the hybrid sensor. The one or more IR sensors may obtain one or more samples at the same time the one or more time-of-flight sensors obtain one or more measurements. The one or more measurements and the one or more samples may be transmitted to a processor. The one or more time-of-flight sensors may return to the dormant state (e.g., low power or sleep mode) after obtaining the one or more measurements, while the processor may compare the one or more measurements and the one or more samples to calibrate the one or more IR sensors.

Other aspects, objectives and advantages of the invention will become more apparent from the following detailed description when taken in conjunction with the accompanying drawings.

BRIEF DESCRIPTION OF THE DRAWINGS

The present disclosure is described by way of example and not limited in the accompanying figures in which.

DETAILED DESCRIPTION OF THE DISCLOSURE

In the following description of the various example embodiments, reference is made to the accompanying drawings, which form a part hereof, and in which is shown by way of illustration various example embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may describe a hybrid sensor that comprises one or more infrared (IR) sensors (e.g., active IR, passive IR, etc.) and one or more time-of-flight (ToF) sensors. The one or more IR sensors, working in conjunction with the one or more ToF sensors, may more accurately detect a user's position and/or distance from the hybrid sensor. A combination of measurements from the one or more IR sensors and the one or more ToF sensors may be provided to a controller to determine whether a user is proximately located to the hybrid sensor. When the user is proximately located to the hybrid sensor, the controller may activate a mechanical operation, such as allowing water to flow from a faucet, flushing a toilet and/or urinal, dispensing soap from an automatic soap dispenser, and/or opening an automatic door.

Example processes, methods, and techniques described herein may include calibrating the one or more IR sensors using the one or more ToF sensors. In this regard, the one or more IR sensors may detect an object (e.g., person). In response to detecting the object, the one or more ToF sensors may be activated. The one or more ToF sensors may obtain one or more measurements, such as the distance the object is from the ToF sensor. At the same time, the one or more IR sensors may obtain one or more samples that may comprise an intensity of infrared light detected by the one or more IR sensors. The one or more measurements (e.g., distance) and the one or more samples (e.g., intensity of detected infrared light) may be used to calibrate the one or more IR sensors to better detect the presence, location, and/or distance of an object. By improving user detection and the determination of a user's actions using the hybrid sensor above, significant energy and/or water savings may be realized.

Figure 1:
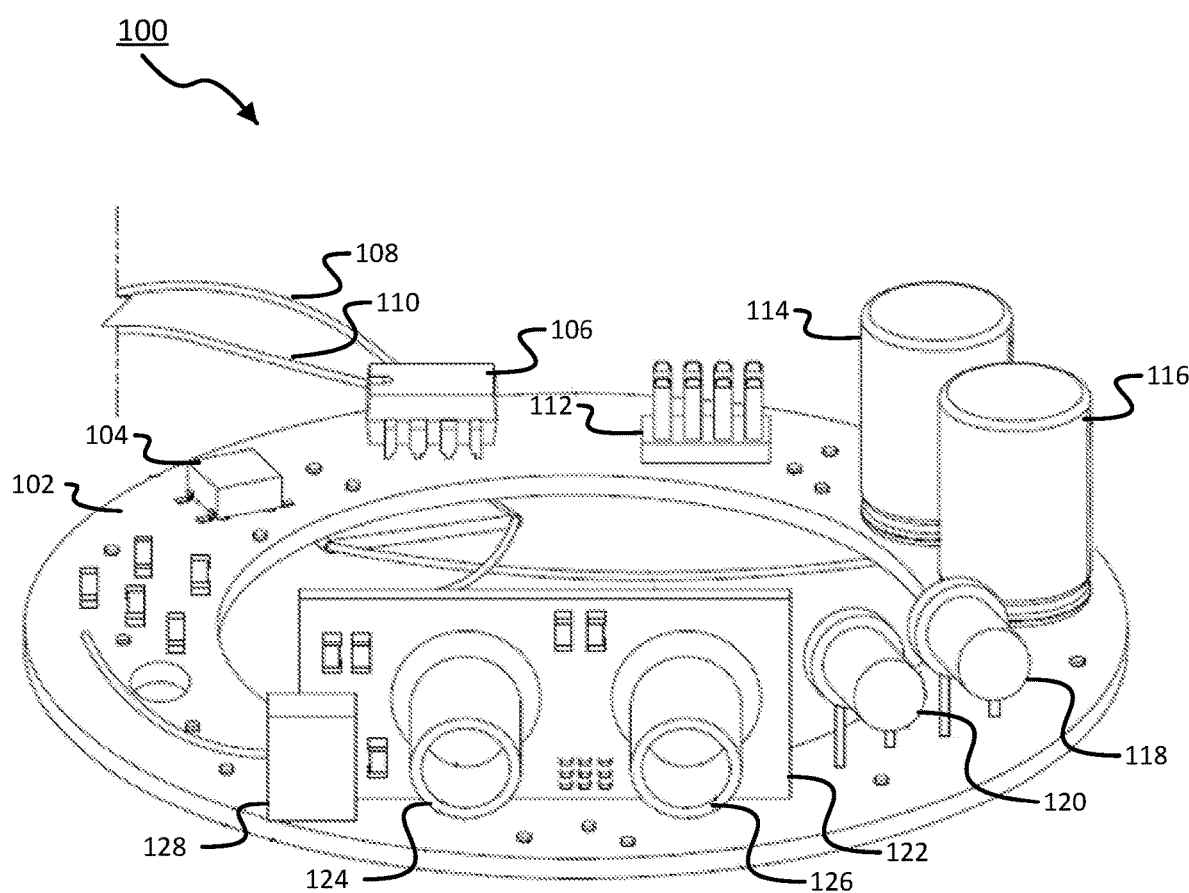
FIG. 1 shows an example of a hybrid sensor circuit according to one or more aspects of the disclosure.

Turning to FIG. 1, an example of a hybrid sensor 100 is shown according to one or more aspects of the disclosure. The hybrid sensor 100 may comprise circuit board 102 that includes processor 104, memory 106, connection module 112, a first capacitor 114, a second capacitor 116, a ToF sensor 122, and an IR sensor comprising a first IR transmitter 118, a second IR transmitter 120, and an IR receiver 128. A data bus (not shown) may interconnect processor 104, memory 106, the first IR transmitter 118, the second IR transmitter 120, the time-of-flight sensor 122, and/or the IR receiver 128. Additionally, a first electrical lead 108 and a second electrical lead 110 may connect circuit board 102 to a power supply (not shown). The power supply may be configured to supply power to hybrid sensor 100 and/or any additional components, such as a flushing mechanism, a soap dispenser, a faucet, etc. In some instances, the power supply may be a low voltage power supply (e.g., 6 volts provided by 4 AA alkaline batteries, a lithium-ion battery, etc.) configured to power hybrid sensor 100 and/or any additional components for between 3-6 years. In other embodiments, the power supply may be connected to a building power supply (e.g., 120 VAC, 60 Hz) via a standard electrical junction box. In these embodiments, a power back-up may be included, for example, in case the building loses power.

As shown in FIG. 1, circuit board 102 may be annular (e.g., ring-shaped). In this regard, an annular shaped circuit board may allow for additional hardware to operate in the center opening of the circuit board. For example, the opening may allow a guide assembly and/or diaphragm of a flush valve to travel, thereby allowing the toilet (or urinal) to flush. Similarly, the opening may allow the hybrid sensor and/or a control module to enclose and control the operation of a faucet. While circuit board 102 is shown as being annular, it will be appreciated that circuit board 102 may be of any appropriate shape and/or size suited to perform the required functionality described herein.

Processor 104 may be any suitable processor configured to control operation of the hybrid sensor 100 and its associated components, including memory 106, the first IR transmitter 118, the second IR transmitter 120, the ToF sensor 122, and/or the IR receiver 128. In this regard, processor 104 may include a single central processing unit (CPU), which may be a single-core or multi-core processor, or may include multiple CPUs. Additionally or alternatively, processor 104 may include a low-power processor and/or microcontroller, such as an Advanced RISC Machine (ARM) processor, an Atmel 8-bit AVR microcontroller, and/or any suitable field programmable array (FPGA) or application specific integrated circuit (ASIC). Processor 104 and/or the associated components described herein may allow the hybrid sensor 100 to execute a series of computer-readable instructions to perform some or all of the processes described herein. In some examples processor 104 may comprise an internal memory. The memory may be cache, random access memory (RAM), read only memory (ROM), electronically erasable programmable read only memory (EEPROM), flash memory, or other memory technology. The memory may be configured to store the series of computer-readable instructions that cause processor 104 to perform some, or all, of the processes described herein.

Memory 106 may include, but is not limited to, random access memory (RAM), read only memory (ROM), electronically erasable programmable read only memory (EEPROM), flash memory, or other memory technology, such as optical disk storage, magnetic cassettes, magnetic tape, magnetic disk storage or other magnetic storage devices, or any other medium that may be used to store the desired information and that may be accessed by processor 104. Software may be stored within memory 106 to provide instructions to processor 104 allowing hybrid sensor 100 to perform various actions. The various hardware memory units in memory 106 may include volatile and nonvolatile, removable and non-removable media implemented in any method or technology for storage of information such as computer-readable instructions, data structures, program modules, or other data.

Connection module 112 may be any connection interface configured to communicate with one or more control modules. For example, connection module 112 may include a plurality of pins (e.g., 4, 6, 8, 12, etc.) configured to receive a female connector from one or more control modules. In this regard, processor 104 may communicate with the one or more control modules via connection module 112. For instance, processor 104 may send a signal and/or power, via connection module 112, to a flush control module. The flush control module may receive the signal and provide a signal to a solenoid, which may cause a plunger to move to effectuate flushing of a toilet (or urinal). Similar operations may occur to turn on a faucet, turn off a faucet, dispense soap, activate a hand dryer, dispense paper towels, open an automatic door, etc.

First capacitor 114 and second capacitor 116 may be capacitors of any suitable size. First capacitor 114 and second capacitor 116 may be bi-stable solenoid driver storage components. In this regard, first capacitor 114 and/or second capacitor 116 may be configured to operate a bi-stable solenoid. For instance, first capacitor 114 may be configured to latch the solenoid and second capacitor 116 may be configured to unlatch the solenoid. Additionally or alternatively, first capacitor 114 and second capacitor 116 may be configured to regulate the voltage to circuit board 102, processor 104, first IR transmitter 118, second IR transmitter 120, time-of-flight sensor 122, and/or IR receiver 128. Moreover, first capacitor 114 and second capacitor 116 may provide better power management capabilities that allow a limited power supply (e.g., 6 V provided by 4 AA alkaline batteries) to power multiple components (e.g., hybrid sensor 100, one or more control modules, etc.) for an extended period of time (e.g. 3-6 years).

First IR transmitter 118 and second IR transmitter 120 may be part of a proximity sensor, such as an infrared sensor. For example, first IR transmitter 118 and/or second IR transmitter 120 may be part of a Sloan® G2 proximity sensor. In some instances, first IR transmitter 118 and/or second IR transmitter 120 may be a low powered IR diode configured to emit (e.g., transmit, irradiate) IR light at a steady (e.g., constant, continuous) rate. In some examples, first IR transmitter 118 may be angled upwards, while second IR transmitter 120 may be angled downward. For example, first IR transmitter 118 may be angled upward between 5 and 50 degrees, and preferably between 15 and 30 degrees. Similarly, the second IR transmitter 120 may be angled downward at a similar angle (e.g., between 5 and 50 degrees, and preferably between 10 and 30 degrees). By angling first IR transmitter 118 and second IR transmitter 120 in different directions, the hybrid sensor may better detect the presence and/or location of a user proximate to hybrid sensor 100 and its relative position with respect to other non-moving (e.g., steady-state) components within range of hybrid sensor 100. In another example, the first IR transmitter 118 and the second IR transmitter 120 may both be angled downward (e.g., between 5 and 50 degrees, and preferably between 10 and 30 degrees) to better ascertain a user's intentions at a plumbing fixture. IR receiver 128 may be another component of the proximity sensor (e.g., the IR sensor). In this regard, IR receiver 128 may be a photodetector or a photoreceptor configured to detect IR light transmitted by first IR transmitter 118 and/or second IR transmitter 120. In this regard, IR receiver 128 may detect an object proximately located to hybrid sensor 100 if a certain amount and/or intensity of IR light was detected. For example, if the detected light was equal to or greater than a predetermined threshold (e.g., a predetermined number of lumens), IR receiver 128 may indicate an object proximate to hybrid sensor 100. Additionally or alternatively, several thresholds may be used to determine how close the object is to the hybrid sensor 100. Indicating an object proximate to hybrid sensor 100 may comprise sending (e.g., transmitting) a signal to processor 104 indicating the presence of the object. First IR transmitter 118, second IR transmitter 120, and IR receiver 128 may be collectively referred to as an IR sensor.

ToF sensor 122 may comprise a ToF transmitter 124 and a ToF receiver 126. In this regard, the ToF transmitter 124 may be a diode configured to emit (e.g. transmit, send) a laser beam at one or more objects. For example, ToF transmitter 124 may be a Vertical Cavity Surface-Emitting Laser (VCSEL) configured to transmit a laser at a predetermined wavelength (e.g., 940 nm). ToF receiver 126 may be a photodetector or a photoreceptor configured to receive the laser beam reflected off of the one or more objects. ToF sensor 122 may be configured to determine how far the one or more objects are from hybrid sensor 100 using the roundtrip time from when the laser was transmitted by ToF transmitter 124 until the reflected laser was received by ToF receiver 126. In some examples, ToF sensor 122 may use a SPAD (Single Photon Avalanche Diodes) array to measure distances up to several meters (e.g., ≥2) away in a short period of time (e.g., <30 ms). In operation, ToF sensor 122 may remain inactive (e.g., dormant, sleep, power-down) because of how much energy it consumes. However, ToF sensor 122 may be activated to calibrate the IR sensors, for example, based on IR receiver 128 indicating an object proximate to hybrid sensor 100. For example, processor 104 may transmit a signal to activate ToF sensor 122 to determine how far an object is from hybrid sensor 100. Additionally or alternatively, IR receiver 128 may transmit a signal to ToF sensor 122 that activates ToF sensor 122, which in turn determines how far an object is from hybrid sensor 100.

After being activated, the ToF sensor 122 may obtain one or more measurements of the object detected by the infrared sensor. As noted above, the ToF sensor 122 may emit a beam of light, for example, from ToF transmitter 124. ToF receiver 126 may detect the beam of light transmitted by the ToF transmitter 124 after it has been reflected off of the object. In some examples, the IR sensor may also obtain one or more measurements of the intensity of the infrared light being reflected off the object, for example, using IR receiver 128. The one or more measurements of the intensity of the infrared light may be obtained simultaneously with the one or more measurements obtained using the ToF sensor 122.

Once the ToF sensor 122 has taken the one or more measurements, it may return to a dormant state (e.g., low power or sleep mode) while the infrared sensor may continue to emit infrared light and/or detect the reflection of the infrared light off of one or more objects. It will be appreciated that ToF sensor 122 may require a significant amount of electrical energy to operate. Thus, returning the ToF sensor 122 to a dormant state after obtaining the one or more measurements may conserve power while obtaining the data to calibrate the IR sensor. As will be discussed in greater detail below with respect to FIG. 3, the measurements taken by the ToF sensor 122 and the IR sensor may be used to calibrate the IR sensor in real time.

Figure 2:
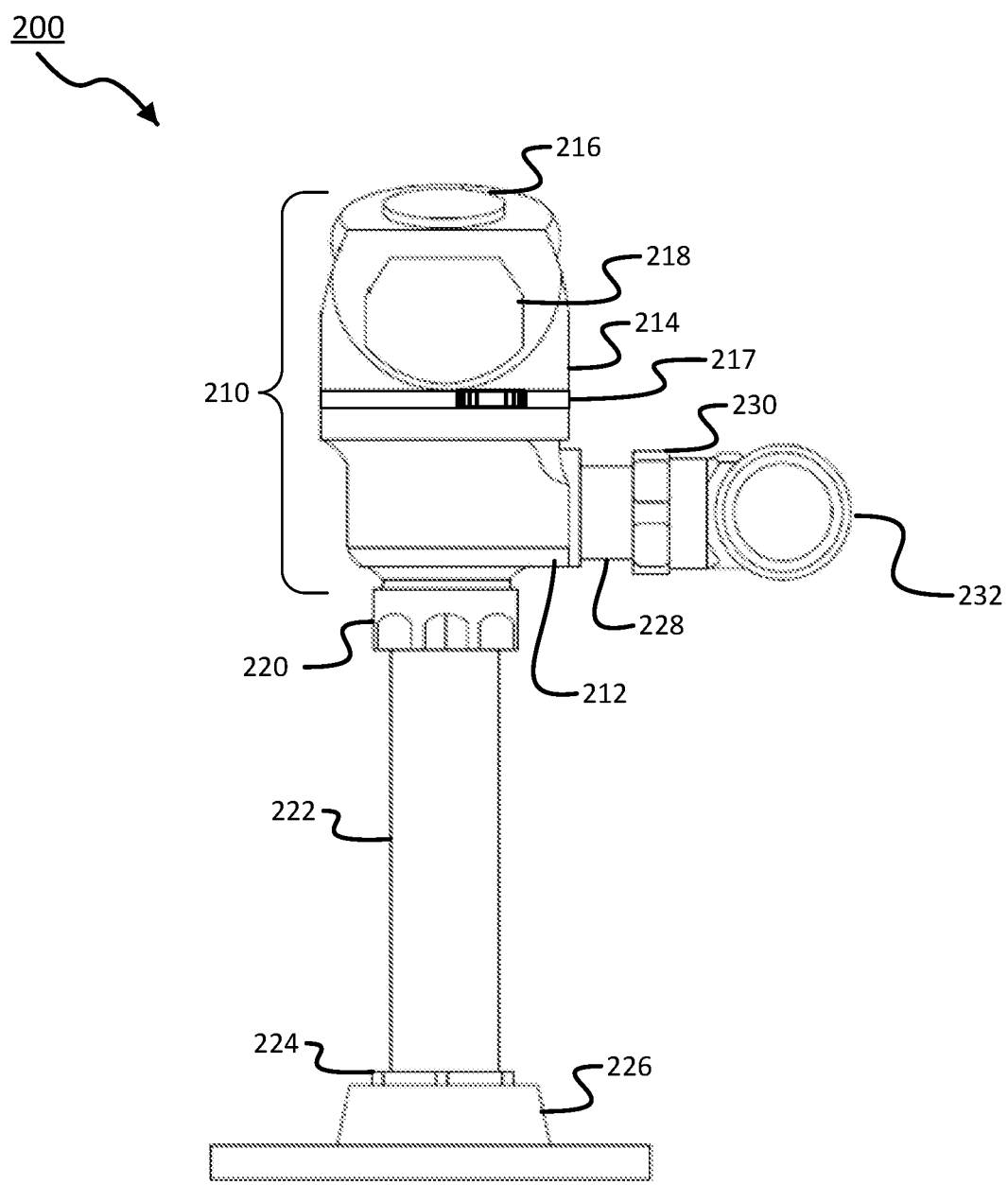
FIG. 2 shows an example of an implementation of the hybrid sensor circuit in an automatic flushometer in accordance with one or more aspects of the disclosure.

As noted above, hybrid sensor 100 may be deployed in a variety of automated fixtures and/or appliances, including automatic faucets, automatic soap dispensers, automatic hand dryers, automatic paper towel dispensers, automatic doors, and the like. FIG. 2 illustrates a bathroom fixture 200 that comprises automatic flushometer 210 which may include a sensor, such as hybrid sensor 100 described above, and a light ring 217.

Flushometer 210 may be connected to a toilet and/or urinal (not shown) via outlet coupling 220, flush connection 222, spud coupling 224, and spud flange 226. Similarly, flushometer 210 may be connected to a supply line (not shown) via tailpiece 228, stop coupling 230, and/or control stop 232. Flushometer 210 may comprise two components: a body 212 and a housing 214. Body 212 may contain the mechanical components to effectuate the flush, including, for example, a guide assembly, a diaphragm, and/or a relief valve. Housing 214 may comprise hybrid sensor 100, as well as a control module (e.g., solenoid with plunger to move the diaphragm to effectuate flushing). In some instances, housing 214 may also comprise a window 218 and a manual flush button 216. Window 218 may be configured to allow light, and in particular IR light, to be transmitted from and received by hybrid sensor 100. Manual flush button 216 may be configured to manually operate the toilet.

The light ring 217 may be disposed within the fixture. The light ring 217 may be part of the flushometer 210 assembly. As shown in FIG. 2, the light ring may be disposed beneath housing 214. It will be appreciated that other configurations may be used for the light ring 217. The light ring 217 may comprise a plurality of light sources (e.g., light emitting diode(s) (LED(s))). The plurality of light sources may be illuminated in a predetermined sequence and/or in an overlapping manner to create a pulse of light. The pulse of light may travel in one or more patterns along the circumference of the light ring. The light ring may use a plurality of light patterns, colors, and/or sequences of light to convey messages and/or signals to owners, maintenance, and/or users. This may allow the owners and/or maintenance to service, or otherwise, maintain the fixture. Moreover, the light ring may provide a better user experience by conveying the messages and/or signals to the user about the status of the fixture and the components thereof.

While FIG. 2 illustrates an example of the hybrid sensor 100 deployed in an automatic flush valve, it will be appreciated that the hybrid sensor 100 may be used in a variety of other implementations. For example, hybrid sensor 100 may be located in a wall-mounted flushometer or an in-wall flushometer. In these examples, the flushometer may be hardwired. In these embodiments, a low voltage power supply, such as the ones described above with respect to FIG. 1, may be included as a back-up power source, for example, if the power in a building were to be lost. Alternatively, the low voltage power supply may be omitted in some embodiments. In addition to flushometers, the hybrid sensor 100 may be implemented in a faucet that controls the flow of water in response to the presence (or absence) of a user. Similarly, hybrid sensor 100 may be used in an automatic soap dispenser, an automatic hand dryer, an automatic paper towel dispenser, etc.

Figure 3:
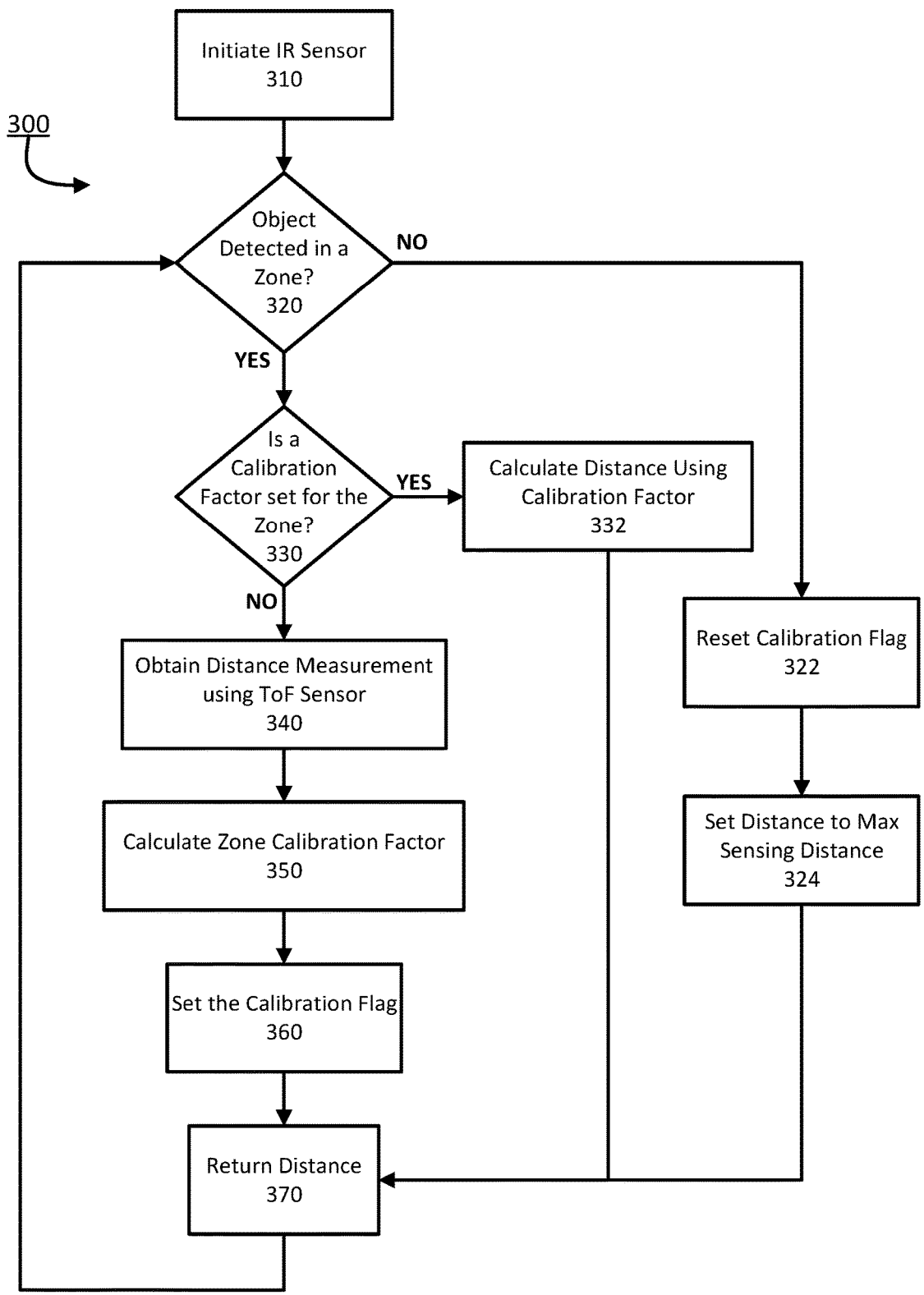
FIG. 3 shows an example of a process for calibrating an infrared sensor according to one or more aspects of the disclosure.

While IR sensors (e.g., transmitters and receivers) are useful in determining the presence of an object, IR sensors may be less reliable when it comes to determining how far an object is from the IR sensor. This is due, in part, to IR light reflecting and/or being absorbed by different materials and/or fabrics at different rates. Accordingly, a ToF sensor may be used to calibrate one or more IR sensors to improve the one or more IR sensors' accuracy in determining the distance of an object. FIG. 3 shows an example of a process 300 for calibrating an IR sensor according to one or more aspects of the disclosure. Some or all of the steps of process 300 may be performed using the hybrid sensor 100 as described herein and/or using one or more computing devices.

In step 310, a hybrid sensor, such as hybrid sensor 100 discussed above with respect to FIG. 1, may initiate an IR sensor. This may include emitting IR light from at least one IR transmitter and detecting (e.g., receiving) IR light reflected off of one or more objects. In step 320, the hybrid sensor may detect an object (e.g., person) in a zone. As will be discussed in greater detail below with respect to FIG. 4, the hybrid sensor may include one or more detection zones. In addition to detecting the object, the hybrid sensor may also determine how far (e.g., an IR distance) the object is from the sensor. This distance may be determined using an intensity and/or magnitude of the light detected by an IR receiver. If an object is not detected in the zone, process 300 proceeds to step 322, wherein the hybrid sensor may reset a calibration flag associated with the zone. In step 324, the distance for the zone may be set to a maximum sensing distance. The maximum sensing distance may be returned in step 370 and the process may continue.

When an object is detected in the zone, process 300 may determine whether a calibration factor exists for the zone in step 330. When the calibration factor is set, the hybrid sensor may calculate how far the object is from the sensor using the calibration factor in step 332. For example, the hybrid sensor may calculate the distance of the object by multiplying the calibration factor by the IR distance. The calculated distance may be returned in step 370 and the process may continue to monitor the object in the zone. When no calibration factor exists for the zone, the hybrid sensor may calculate the calibration factor.

In step 340, the hybrid sensor may obtain a measured distance of the object using one or more ToF sensors. As noted above with respect to FIG. 1, the hybrid sensor may activate the one or more ToF sensors, for example, in response to an IR sensor detecting an object in the zone. In this regard, the one or more ToF sensors may transmit a signal (e.g., laser) in the direction of the object and determine the time to detect the reflected signal. The roundtrip time may then be used to calculate the actual distance of the object. In step 350, the hybrid sensor may calculate the zone calibration factor. The zone calibration factor may be calculated by dividing the actual distance (determined by the one or more ToF sensors) by the IR distance (determined by the IR sensor). In step 360, the hybrid sensor may set a calibration flag for the zone. Finally, in step 370, the hybrid sensor may return the distance. In this regard, the hybrid sensor may multiply the IR measurement by the newly calculated calibration factor to determine the distance that is returned to the hybrid sensor 100. As noted above, the hybrid sensor may define a plurality of zones. Process 300 may be repeated to calibrate the IR sensor for each of the plurality of zones.

By using the one or more measurements obtained by the ToF sensor and the corresponding samples taken by the IR sensor, the IR sensor may be calibrated to be much more precise at detecting the presence and/or position of one or more objects. Moreover, the calibrated IR sensor may be able to more precisely detect the presence and/or position of one or more objects regardless of the color and/or material of the one or more objects.

Figure 4:
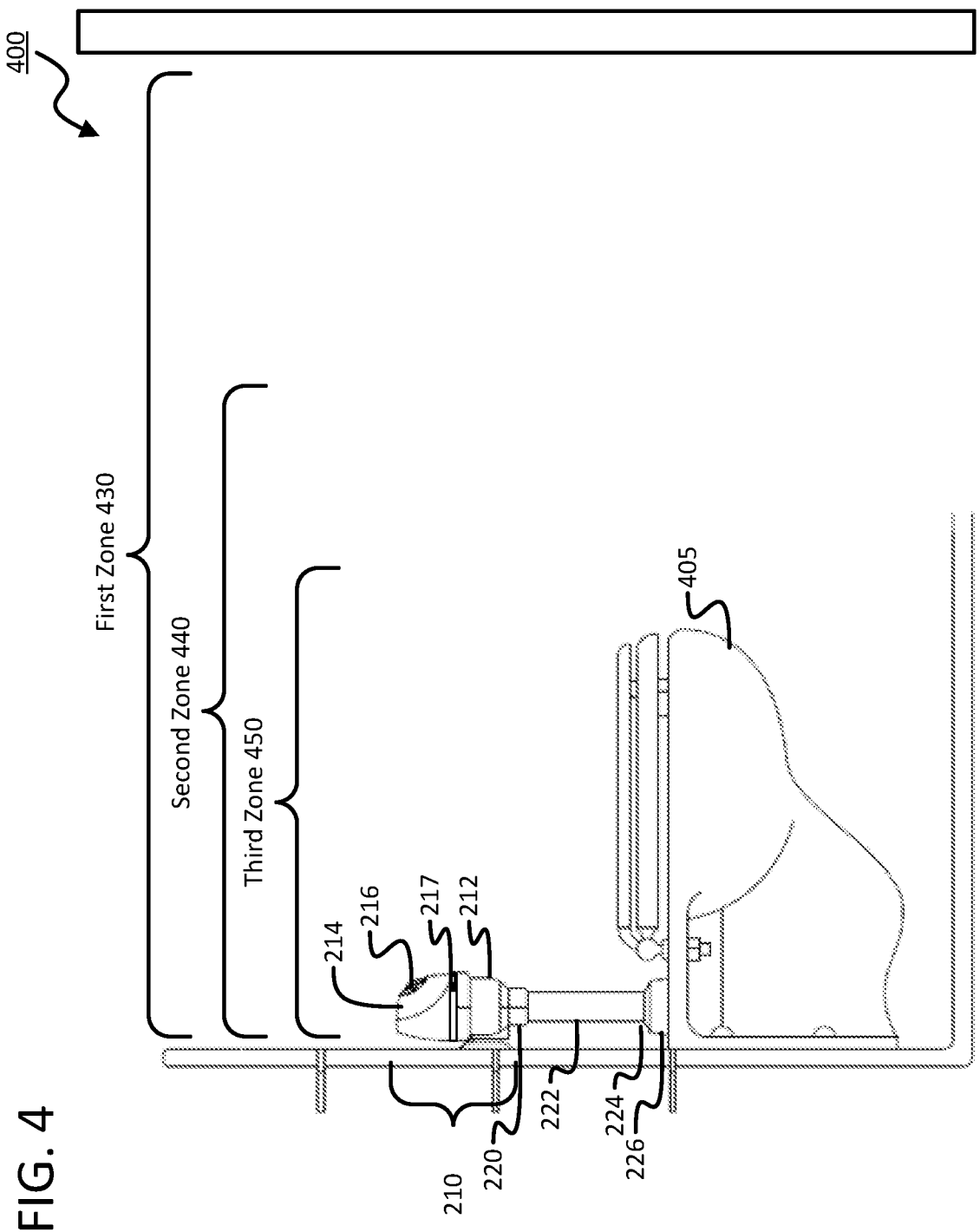
FIG. 4 shows an example of sampling zones for a hybrid sensor in accordance with one or more aspects of the disclosure.

As noted above, a hybrid sensor may define one or more detection zones. FIG. 4 shows an example of three detection zones in a bathroom 400. Bathroom 400 may comprise a flushometer 210 connected to toilet 405 via outlet coupling 220, flush connection 222, spud coupling 224, and spud flange 426. Flushometer 210 may also be connected to a supply line (not shown). As discussed above with respect to FIG. 2, flushometer 410 may comprise two components: a body 212 and a housing 214 that includes a hybrid sensor 100, a control module (e.g., solenoid with plunger to move the diaphragm to effectuate flushing), a window 218, and a manual flush button (not shown). The housing 214 may comprise a light ring 217 which may be used to provide a visual indication to a user. Additionally or alternatively, the light ring 217 may provide diagnostics for maintenance, servicing, repairing, etc. It will be appreciated that the flushometer 210 may be a wall-mount or an in-wall flushometer that is hardwired to a power supply (e.g., 120 VAC).

In operation, flushometer 210 (e.g., hybrid sensor 100 included in flushometer 210) may define one or more detection zones. As shown in FIG. 4, flushometer may define a first detection zone 430, a second detection zone 440, and/or a third detection zone 450. The first detection zone 430 may be considered an entering zone, where a user makes an approach (e.g., an initial approach) toward the hybrid sensor. The second detection zone 440 may be considered a standing zone, where the user may be standing proximate to the hybrid sensor (e.g., evacuating their bladder over a toilet, standing at a sink to wash their hands, standing at hand dryer and/or paper towel dispenser, etc.). The third detection zone 450 may be a sitting zone, where the user may be sitting proximate to the hybrid sensor. While FIG. 4 shows three detection zones, it will be appreciated that more, or fewer, detection zones may be employed. For example, urinals, paper towel dispensers, hand dryers, and the like may eliminate the third zone (e.g., the sitting zone). Accordingly, these appliances may only need two detection zones to operate.

In operation, flushometer 210 (e.g., hybrid sensor 100 located within flushometer 210) may obtain a plurality of initial readings from the IR sensors for each of the zones. These initial readings may serve as a baseline reading for each of the zones. That is, a light intensity detected from each of the zones may serve as a baseline data point. Changes in the light intensity from the baseline data point may indicate the presence of an object (e.g., person) within the detection zone.

Turning to the example shown in FIG. 4, the flushometer 210, and in particular the hybrid sensor 100 located within flushometer 210, may be capable of detecting the presence of an object, such as a person, in the first zone 430. Detecting an object in the first zone 430 may represent the person entering a bathroom stall. As discussed above, the ToF sensor may be activated, for example, in response to detecting the person in the first zone 430. The ToF sensor may begin obtaining measurements of the object, while the infrared sensor may simultaneous record samples of the infrared light (e.g., the intensity of the infrared light) reflected off of the person in the first zone 430.

While the person remains within the first zone 430, the sensor may refrain from sending one or more signals that may effectuate flushing of the toilet 405. However, if the person enters the second zone 440, but not the third zone 450, the sensor may send a first signal, to a control module. The first signal may include instructions, such as instructions to flush the toilet 405 using a low flow setting. If the person enters the third zone 450, the sensor may send a second signal with different instructions. For instance, the second signal may indicate a high flow setting for flushing toilet 405. It will be appreciated that the techniques used above may prevent inadvertent flushing and conserve water by modulating the type of flush based on which zones the person was detected in. Moreover, the techniques described herein may control the visual indicating light ring 217 and the messages/signaling conveyed by the light ring 217.

Figure 5:
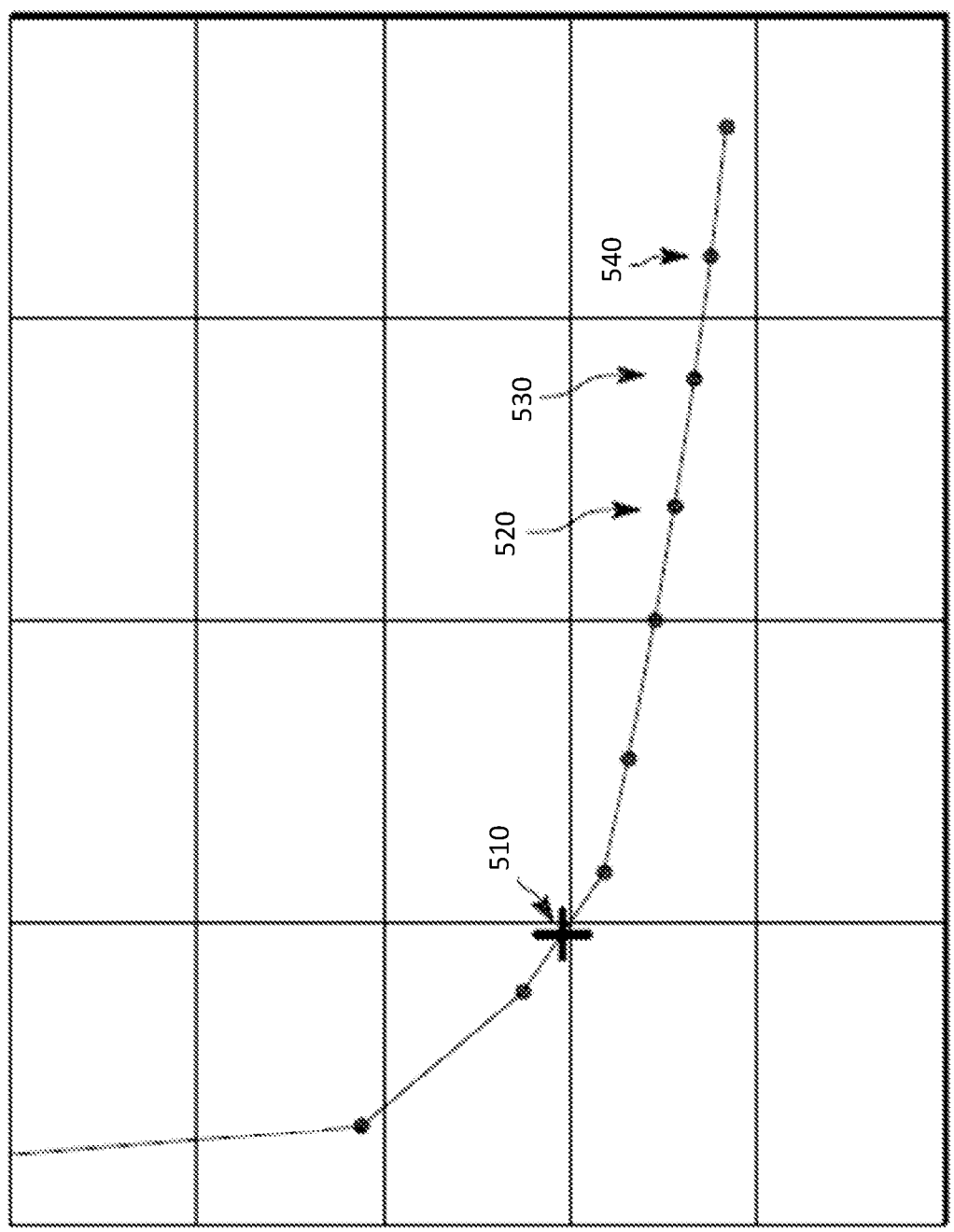
FIG. 5 shows an interpolation graph illustrating a typical infrared response reading versus the actual distance of objects.

With reference to FIG. 5, an example of an interpolation graph 500 of the hybrid sensor detecting an approaching user in accordance with one or more aspects of the disclosure is shown. As discussed above, one or more IR sensors may transmit and receive IR signals within their line of sight. The ToF sensor may be in a dormant state (e.g., sleep mode, low-power mode, powered off, etc.) while the one or more IR sensors transmit and receive IR signals. Upon detecting an object, the one or more IR sensors may activate the one or more ToF sensors. After being activated, the one or more IR sensors and the one or more ToF sensors may record several data points simultaneously, for example, as a user approaches (or walks away from) the hybrid sensor. Once several data points have been recorded, the one or more ToF sensors may return to a dormant state. However, the hybrid sensors may use the data points obtained from the ToF sensor to calibrate the one or more IR sensors. That is, the hybrid sensor may use the ToF data points to determine how accurate (or inaccurate) the IR sensors are. In this regard, the hybrid sensor may compare a first data point of the object's distance as calculated by the one or more IR sensors to a second data point of the object's distance as calculated by the one or more ToF sensors. This comparison may be represented by interpolation value 510. Interpolation value 510 may represent the object's distance as determined using both the one or more IR sensors and the one or more ToF sensors. A first tabulated value 520, a second tabulated value 530, and a third tabulated value 540 may correspond to other interpolated data points calculated by the hybrid sensor using measurements from both the one or more IR sensors and the one or more ToF sensors. As seen in FIG. 5, an object (e.g., person) may be approaching the hybrid sensor. Due to the non-linear nature of the values, graph 500, and the interpolated values contained therein, may not be used to consistently determine the location of an object. To address this issue, the hybrid sensor may include a look up table that may be accessed to help linearize the graph 500 and the measurements concurrently obtained by the one or more ToF sensors and the one or more IR sensors. A significant change in the output voltage of the one or more IR sensors may not be indicative of a change in the range of an object. In this regard, the one or more ToF sensors may be used to convert the output voltage of the one or more IR sensors into a range value that linearizes the graph 500.

Figure 6:
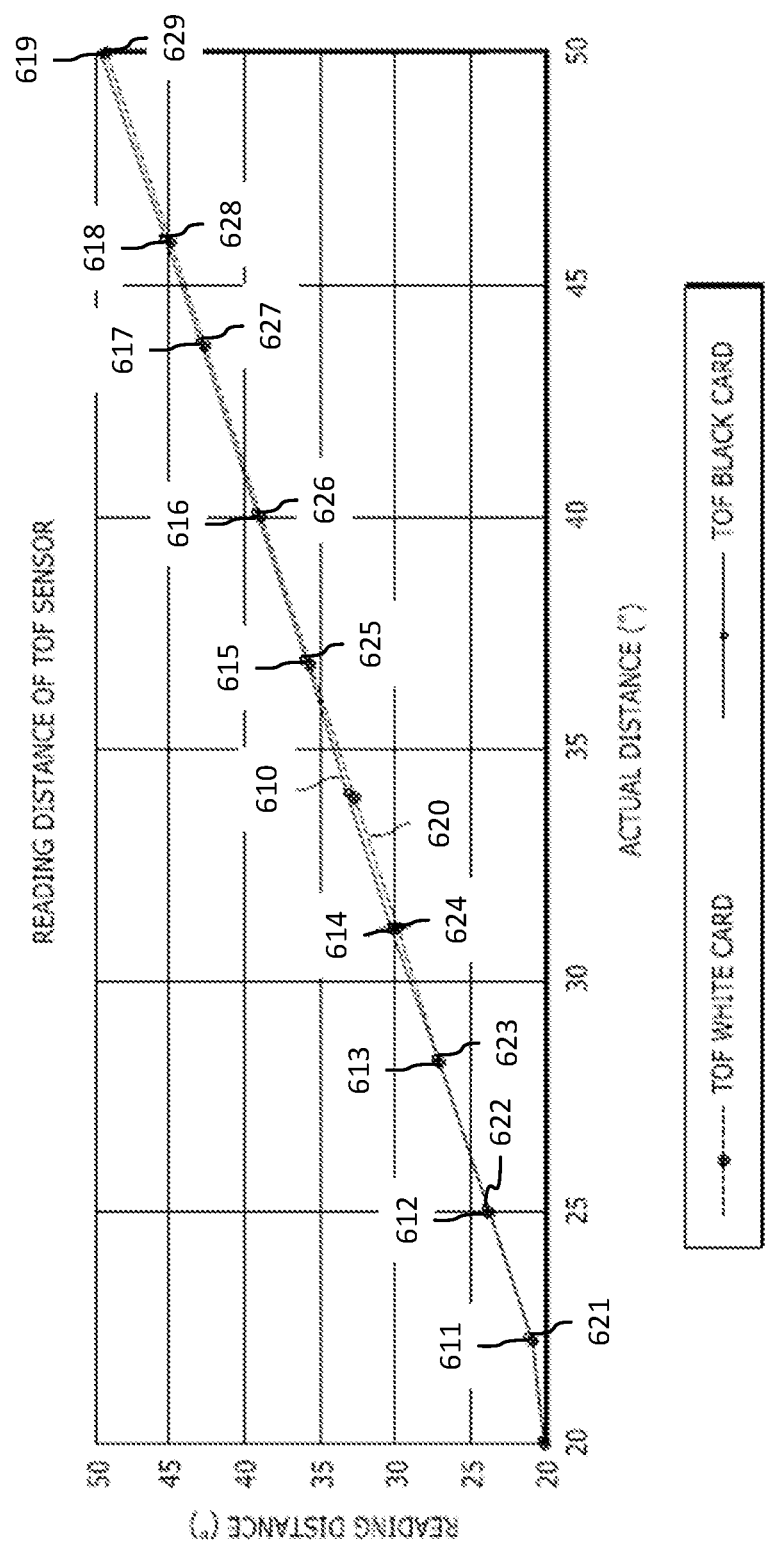
FIG. 6 shows an accuracy graph illustrating the distances detected by a time of flight sensor compared to the actual distance of the objects.

Turning to FIG. 6, an accuracy graph illustrating the accuracy of a ToF is shown. To show the accuracy of the ToF sensor, a white card and a black card were held at predetermined distances from the ToF sensor. The actual distance versus the distance read by the ToF sensor were plotted in graph 600. In this regard, the x-axis of graph 600 shows the actual distance of the card (e.g., in inches), while the y-axis shows the distance read by the ToF sensor (e.g., in inches). The first line 610 (i.e., the solid line) is based on a plurality of measurements (e.g., 611, 612, 613, 614, 615, 616, 617, 618, 619) taken at various distances. In this regard, a black card was held in front of the ToF sensor and the actual distance versus the measured distance (e.g., read distance) was plotted at points 611, 612, 613, 614, 615, 616, 617, 618, and 619. A similar experiment was performed with a white card. The results of that experiment are shown by the second line 620 (i.e., the dotted line). Second line 620 includes a plurality of measurements (e.g., 621, 622, 623, 624, 625, 626, 627, 628, 629) that indicate the actual distance versus the measured distance (e.g., read distance) of the white card. As shown in FIG. 6, the ToF sensor is relatively accurate regardless of the disparate colors of the measured object.

Figure 7:
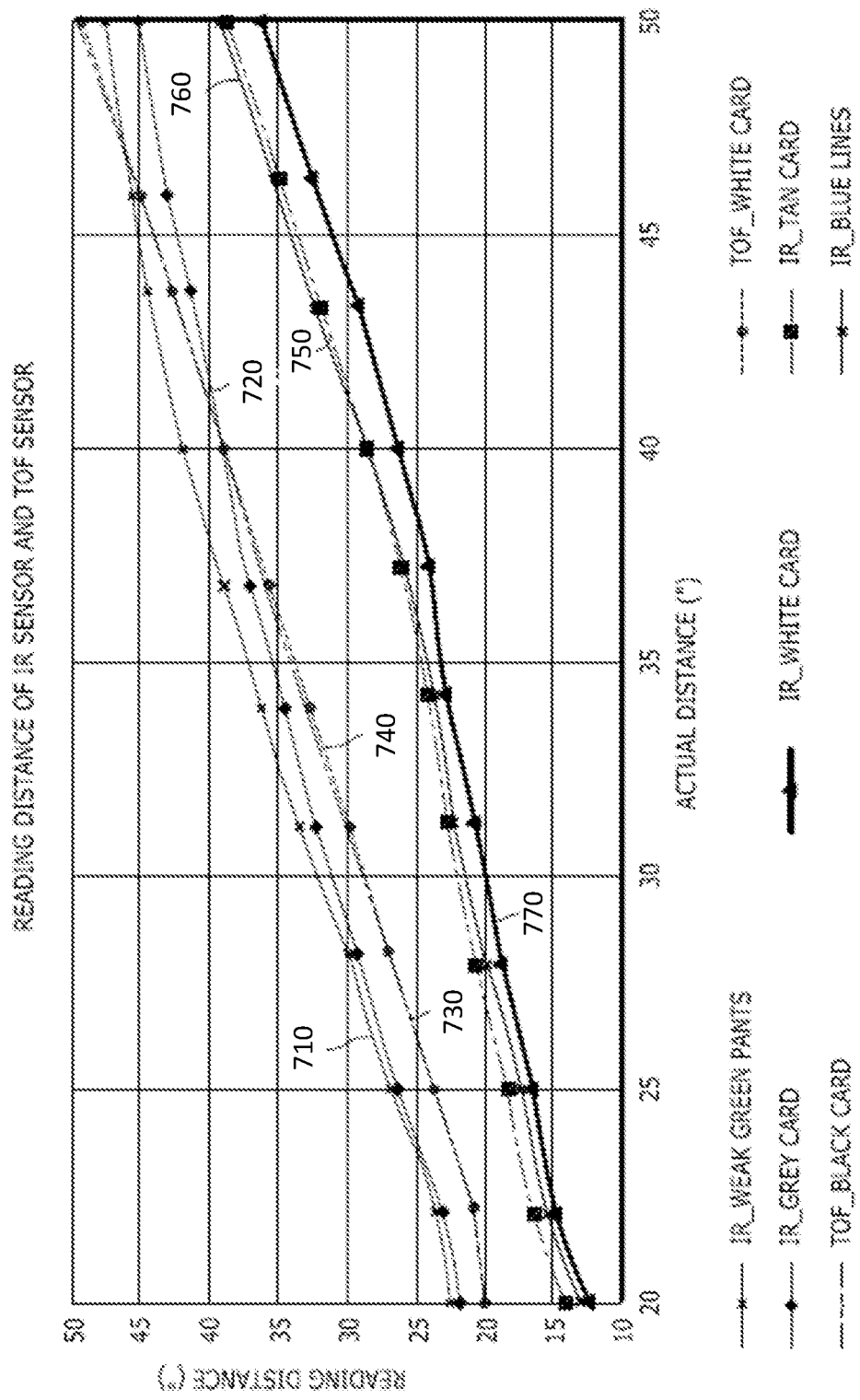
FIG. 7 shows an accuracy graph illustrating the distances of objects of different colors compared to the actual distance of the objects.

FIG. 7 shows another accuracy graph 700 illustrating the accuracy of an IR sensor and a ToF sensor. To show the accuracy of both sensors, a plurality of objects (e.g., cards, pants, etc.) of a variety of colors (green, grey, black, white, etc.) were positioned at predetermined distances from the IR sensor and the ToF sensor. The actual distance versus the distance read by the IR sensor and/or the ToF sensor were plotted in graph 700. In this regard, the x-axis of graph 700 shows the actual distance of the card (e.g., in inches), while the y-axis shows the distance read by the ToF sensor (e.g., in inches). The first line 710 may be based on one or more measurements of a pair of weak green pants taken at various distances. The one or more measurements may be obtained, for example, by the IR sensor. The second linearization 720 may be based on one or more measurements of a gray card, taken at various distances, by the IR sensor. The third line 730 may be based on a plurality of measurements of a black card, taken at a variety of distances, by the ToF sensor. The fourth line 740 may be based on one or more measurements of a white card, taken at various distances, by the ToF sensor. The fifth line 750 may be based on one or more measurements of a tan card taken by the IR sensor. The sixth line 760 may be based on one or more measurements of blue lines, obtained at variety of distances, with the IR sensor. Finally, the seventh line 770 may be based on one or more measurements of a white card, obtained at various distances, by the IR sensor.

As can be seen from the plotted lines in FIG. 7, the reading distances of the various objects (e.g. green pants, grey card, black card, etc.) taken by the IR sensor and the actual distances of those objects were not as accurate as the measurements obtained by the ToF sensor. Moreover, color and/or distance had more of an impact on the IR sensor than the ToF sensor. For example, the error rate of the IR sensor was worse with certain colors (e.g., line 750 representing the tan card) and various distances. In this regard, color and/or distance had little to no impact on the ToF sensor.

Figure 8:
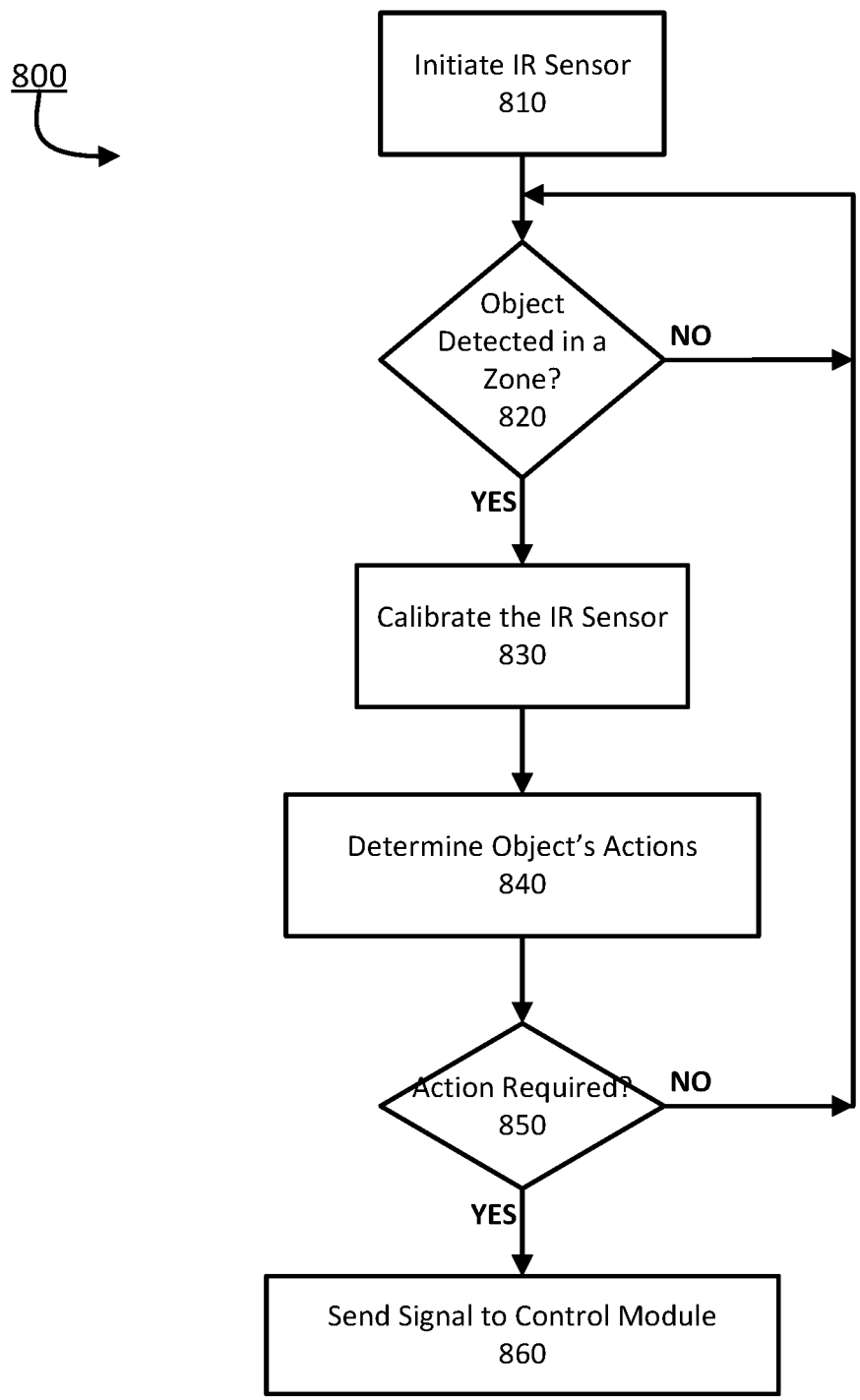
FIG. 8 shows an example of a process for activating a control module in response to detecting the presence of an object according to one or more aspects of the disclosure.

The hybrid sensor described herein may be deployed in one of a variety of real-world scenarios discussed above (e.g., flushometer, urinal, faucet, hand dryer, paper towel dispenser, door opener, etc.). FIG. 8 shows an example of a process 800 for activating a control module in response to detecting the presence of an object according to one or more aspects of the disclosure. Some or all of the steps of process 800 may be performed using the hybrid sensor 100 as described herein and/or using one or more computing devices.

In step 810, the IR sensor may be initiated. As discussed above with respect to FIG. 1, one or more IR transmitters may emit (e.g., transmit, irradiate) IR light at a steady (e.g., constant, continuous) rate. The IR sensor may be initiated, for example, based on or in response to the hybrid sensor being powered on.

In step 820, the hybrid sensor may determine whether an object (e.g., person) has entered a detection zone. In this regard, an IR sensor (e.g., a photoreceptor component of the IR sensor) may detect IR light reflected off of an object. The IR sensor may detect an object proximately located to the hybrid sensor, for example, if a certain amount and/or intensity of IR light is detected. If the hybrid sensor does not detect an object in a detection zone, the hybrid sensor loops back to step 820 to determine whether an object (e.g., person) has entered a detection zone. When the hybrid sensor detects an object in a detection zone, the hybrid sensor proceeds to step 830.

In step 830, the hybrid sensor may calibrate the IR sensor. Calibration of the IR sensor may occur in real-time using the techniques described above with respect to FIG. 3. In this regard, the hybrid sensor may activate one or more ToF sensors, for example, based on or in response to the IR sensor detecting an object in one or more detection zones. Both the ToF sensor and the IR sensor may obtain one or more measurements of the distance the object is from the hybrid sensor, and the one or more measurements may be correlated to calibrate the IR sensor.

After calibrating the IR sensor, the hybrid sensor may determine the object's actions in step 840. For example, if the IR sensor detects in the first zone (e.g., the entering zone), the IR sensor may determine that the object (e.g., person) is approaching a fixture (e.g., toilet, urinal, faucet, etc.) and/or appliance (e.g., paper towel dispenser, hand dryer, etc.). If the sensor detects the object in the second zone (e.g., standing zone), the hybrid sensor may determine that the object (e.g., person) is proximately located to the hybrid sensor. In step 850, the hybrid sensor may determine whether an action is required. Continuing the examples above, the hybrid sensor may determine that no action is required, for example, if the object (e.g., person) is detected in the first zone. Additionally or alternatively, the hybrid sensor may determine that an action is required, for example, if the object (e.g., person) is detected in the second zone. These actions may include, for example, flushing a toilet/urinal, turning on a faucet, dispensing soap, dispensing a paper towel, opening a door, etc. In step 860, the hybrid sensor may send a signal to a control module to effectuate one of the actions described above. In addition to effectuating a flush, the control module may, for example, activate a motor to dispense paper towels or soap. Alternatively, the control module may activate a blower as part of turning on a hand dryer.

It will be appreciated that the apparatuses, methods, processes, and techniques described above may conserve resources by more effectively determining the location and/or actions of a person. For example, the sensors described herein may conserve water at toilets and urinals by modulating the type of flush based on the user's detected position and/or actions. Similarly, paper towels may be distributed more equitably, hand dryers may more turn on and off more reliably, and a variety of other savings may be realized.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although certain specific aspects of various example embodiments have been described, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. Thus, embodiments disclosed should be considered in all respects as examples and not restrictive. Accordingly, the scope of the inventions herein should be determined not by the embodiments illustrated, but by the appended claims and their equivalents.

The invention claimed is:

1. A method comprising:
    transmitting, by a first device, at least one infrared signal from an infrared sensor;
    determining, by the infrared sensor, that an object is located in a zone based on detecting a predetermined amount of infrared light received by the infrared sensor;
    determining whether a calibration factor has been established for the zone;
    activating, based on a determination that the calibration factor has not been established for the zone, a time-of-flight sensor;
    determining, using the time-of-flight sensor, a first distance of the object from the first device;
    calculating, by the first device, the calibration factor by dividing the first distance determined by the time-of-flight sensor by a second distance determined using the infrared sensor;
    setting, by the first device, a calibration flag for the zone; and
    providing the first distance to a control module to determine whether further action is needed.

2. The method of claim 1, further comprising:
    multiplying, based on a determination that the calibration factor has been established for the zone, the calibration factor by the second distance to determine an actual distance of the object; and
    providing the actual distance to the control module to determine whether further action is needed.

3. The method of claim 1, wherein the further action comprises at least one of flushing a toilet, flushing a urinal, activating a faucet, deactivating a faucet, dispensing soap, dispensing a paper towel, activating a hand dryer, or opening a door.

4. The method of claim 1, further comprising:
    transmitting, by a first infrared transmitter of the infrared sensor, a first infrared signal at a first angle; and
    transmitting, by a second infrared transmitter of the infrared sensor, a second infrared signal at a second angle.

5. The method of claim 1, wherein the predetermined amount of infrared light comprises a predetermined number of lumens.

6. The method of claim 1, further comprising:
    deactivating the time-of-flight sensor after determining the first distance of the object.

7. The method of claim 1, further comprising:
    determining, by the infrared sensor, that the object is located in a second zone based on detecting a second predetermined amount of infrared light received by the infrared sensor;
    determining whether a second calibration factor has been established for the second zone;
    activating, based on a determination that the second calibration factor has not been established for the second zone, the time-of-flight sensor;
    determining, using the time-of-flight sensor, a third distance of the object from the first device;
    calculating, by the first device, the second calibration factor by dividing the third distance determined by the time-of-flight sensor by a fourth distance determined using the infrared sensor; and setting, by the first device, a second calibration flag for the second zone.

8. A computing device comprising:
    one or more processors;
    memory storing instructions that, when executed by the one or more processors, cause the computing device to:
        transmit at least one infrared signal from an infrared sensor;
        determine, by the infrared sensor, that an object is located in a zone based on detecting a predetermined amount of infrared light received by the infrared sensor;
        determine whether a calibration factor has been established for the zone;
        activate, based on a determination that the calibration factor has not been established for the zone, a time-of-flight sensor;
        determine, using the time-of-flight sensor, a first distance of the object from the computing device;
        calculate the calibration factor by dividing the first distance determined by the time-of-flight sensor by a second distance determined using the infrared sensor;
        set a calibration flag for the zone; and
        provide the first distance to a control module to determine whether further action is needed.

9. The computing device of claim 8, wherein the instructions, when executed by the one or more processors, cause the computing device to:
    multiply, based on a determination that the calibration factor has been established for the zone, the calibration factor by the second distance to determine an actual distance of the object; and
    provide the actual distance to the control module to determine whether further action is needed.

10. The computing device of claim 8, wherein the further action comprises at least one of flushing a toilet, flushing a urinal, activating a faucet, deactivating a faucet, dispensing soap, dispensing a paper towel, activating a hand dryer, or opening a door.

11. The computing device of claim 8, wherein the instructions, when executed by the one or more processors, cause the computing device to:
    transmit, by a first infrared transmitter of the infrared sensor, a first infrared signal at a first angle; and
    transmit, by a second infrared transmitter of the infrared sensor, a second infrared signal at a second angle.

12. The computing device of claim 8, wherein the predetermined amount of infrared light comprises a predetermined number of lumens.

13. The computing device of claim 8, wherein the instructions, when executed by the one or more processors, cause the computing device to:
    deactivate the time-of-flight sensor after determining the first distance of the object.

14. The computing device of claim 8, wherein the instructions, when executed by the one or more processors, cause the computing device to:
    determine, by the infrared sensor, that the object is located in a second zone based on detecting a second predetermined amount of infrared light received by the infrared sensor;
    determine whether a second calibration factor has been established for the second zone;
    activate, based on a determination that the second calibration factor has not been established for the second zone, the time-of-flight sensor;

determine, using the time-of-flight sensor, a third distance of the object from the computing device;
calculate the second calibration factor by dividing the third distance determined by the time-of-flight sensor by a fourth distance determined using the infrared sensor; and
set a second calibration flag for the second zone.

15. An apparatus comprising
a processor;
a memory;
at least one infrared sensor comprising:
   an infrared transmitter configured to emit infrared light; and
   an infrared receiver configured to detect infrared light reflected from one or more objects; and
at least one time-of-flight sensor comprising:
   a first transmitter; and
   a first receiver,
wherein the at least one time-of-flight sensor remains in a dormant state until the at least one infrared sensor detects an object.

16. The apparatus of claim 15, wherein the at least one infrared sensor comprises:
a second infrared transmitter.

17. The apparatus of claim 16, wherein the infrared transmitter and second infrared transmitter are angled in opposite directions.

18. The apparatus of claim 15, wherein the at least one infrared sensor is further configured to activate the at least one time-of-flight sensor in response to detecting an object.

19. The apparatus of claim 18, wherein the at least one time-of-flight sensor is configured to obtain a plurality of measurements of a distance the object is from the at least one time-of-flight sensor.

20. The apparatus of claim 19, wherein the processor is configured to calibrate the at least one infrared sensor by comparing a first distance measured by the at least one time-of-flight sensor and a second distance measured by the at least one infrared sensor.

21. The apparatus of claim 15, further comprising:
a connection module configured to communicate with one or more control modules.

22. The apparatus of claim 15, further comprising:
a low-voltage power supply.

23. The apparatus of claim 15, further comprising at least one of:
an alkaline battery; or
a lithium battery.

24. A system comprising:
a hybrid sensor comprising:
   at least one infrared sensor comprising:
      a first infrared transmitter configured to emit infrared light; and
      an infrared receiver configured to detect infrared light reflected from one or more objects; and
   at least one time-of-flight sensor comprising:
      a first transmitter; and
      a first receiver, wherein the at least one time-of-flight sensor is in kept in a dormant state until the at least one infrared sensor detects an object;
a control module; and
a power supply.

25. The system of claim 24, wherein the power supply comprises a low-voltage power supply.

26. The system of claim 24, wherein the power supply comprises an alkaline battery.

27. The system of claim 24, wherein control module comprises:
a solenoid configured to operate an automatic flush valve.

28. The system of claim 24, wherein control module comprises:
a motor configured to dispense paper towels.

29. The system of claim 24, wherein control module comprises:
a motor configured to dispense soap.

30. The system of claim 24, wherein control module comprises:
a blower configured to operate a hand dryer.

* * * * *